US010991150B2

United States Patent
Elgharib et al.

(10) Patent No.: US 10,991,150 B2
(45) Date of Patent: Apr. 27, 2021

(54) VIEW GENERATION FROM A SINGLE IMAGE USING FULLY CONVOLUTIONAL NEURAL NETWORKS

(71) Applicants: Massachusetts Institute of Technology, Cambridge, MA (US); Qatar Foundation for Education, Science and Community Development, Doha (QA)

(72) Inventors: Mohamed Elgharib, Doha (QA); Wojciech Matusik, Cambridge, MA (US); Sung-Ho Bae, Cambridge, MA (US); Mohamed Hefeeda, Doha (QA)

(73) Assignees: MASSACHUSETTS INSTITUTE OF TECHNOLOGY, Cambridge, MA (US); QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 136 days.

(21) Appl. No.: 16/181,406

(22) Filed: Nov. 6, 2018

(65) Prior Publication Data

US 2019/0347847 A1 Nov. 14, 2019

Related U.S. Application Data

(60) Provisional application No. 62/668,845, filed on May 9, 2018.

(51) Int. Cl.
*G06K 9/00* (2006.01)
*G06T 15/20* (2011.01)
(Continued)

(52) U.S. Cl.
CPC ............. *G06T 15/205* (2013.01); *G06N 3/08* (2013.01); *H04N 13/15* (2018.05); *H04N 13/161* (2018.05)

(58) Field of Classification Search
CPC .... G06T 15/205; H04N 13/15; H04N 13/161; G06N 3/08; G06N 3/0481; G06N 3/0454
(Continued)

(56) References Cited

U.S. PATENT DOCUMENTS 8,953,905 B2 2/2015 Sandrew et al.
10,841,577 B2 * 11/2020 Cho ...................... H04N 19/176
(Continued)

FOREIGN PATENT DOCUMENTS

WO 2017021731 A1 2/2017

OTHER PUBLICATIONS

Berkeley 3-D object dataset. http://kinectdata.com/, 2011.
(Continued)

*Primary Examiner* — Van D Huynh
(74) *Attorney, Agent, or Firm* — Soroker Agmon Nordman (57) ABSTRACT

A method of rendering a stereoscopic 3D image from a single image, including receiving a collection of pairs of 3D images including an input image and an output image that is a 3D pair of the input image, training a neural network composed of convolutional layers without any fully connected layers, with pairs of 3D images from the collection, to receive an input image and generate an output image that is a 3D pair of the input image, wherein the neural network is provided as an application on a computing device, receiving an input image and generating an output image that is a 3D pair of the input image by the neural network.

19 Claims, 6 Drawing Sheets

(51) Int. Cl.
  *H04N 13/15* (2018.01)
  *H04N 13/161* (2018.01)
  *G06N 3/08* (2006.01)
(58) Field of Classification Search
  USPC .......................................................... 382/156
  See application file for complete search history.

(56) References Cited

U.S. PATENT DOCUMENTS

| | | | |
|---|---|---|---|
| 2012/0113117 A1 | 5/2012 | Nakayama et al. | |
| 2013/0106837 A1 | 5/2013 | Mukherjee et al. | |
| 2013/0147911 A1 | 6/2013 | Karsch et al. | |
| 2015/0093017 A1 | 4/2015 | Hefeeda et al. | |
| 2016/0125572 A1* | 5/2016 | Yoo | G06T 15/205 382/157 |
| 2017/0091951 A1* | 3/2017 | Yoo | G06T 7/11 |
| 2019/0220746 A1* | 7/2019 | Liu | G06N 3/08 |
| 2019/0379883 A1* | 12/2019 | Wang | G06F 17/15 |
| 2020/0380687 A1* | 12/2020 | Avital | A61B 5/0042 |

OTHER PUBLICATIONS

Make3D. http://make3d.cs.cornell.edu/data.html, 2007.
NYU depth dataset v2. http://cs.nyu.edu/~silberman/datasets/nyu_depth_v2.html, 2012.
RGB-D object dataset, http://rgbd-dataset.cs.washington.edu/, 2011.
ITU-R BT.2021, Subjective methods for the assessment of stereoscopic 3DTV systems. Geneva, Switzerland, Nov. 2012. International Telecommunication Union.
P. Bhat, B. Curless, M. Cohen, and C. Zitnick. Fourier analysis of the 2D screened poisson equation for gradient domain problems. In Proc. of European Conference on Computer Vision (ECCV'08), pp. 114-128. Marseille, France, Oct. 2008.
T. Brox, A. Bruhn, N. Papenberg, and J. Weickert. High accuracy optical ow estimation based on a theory for warping. In Proc. of European Conference on Computer Vision (ECCV'04), pp. 25-36, Prague, Czech Republic, May 2004.
K. Calagari, K. Templin, T. Elgamal, K. Diab, P. Didyk, W. Matusik, and M. Hefeeda Anahita: A System for 3D Video Streaming with Depth Customization. In Proc. of ACM Multimedia (MM'14), pp. 337-346, Orlando, Fl. Nov. 2014.
D. Hoiem, A. A. Efros, and M. Hebert. Automatic photo pop-up. ACM Transactions on Graphics, 24(3):577{584, 2005.
K. Karsch, C. Liu, and S. B. Kang. Depth transfer: Depth extraction from video using non-parametric sampling. IEEE Transactions on Pattern Analysis and Machine Intelligence, 36(11):2144{2158, 2014.
J. Ko. 2D-to-3D Stereoscopic Conversion: Depth Estimation in 2D Images and Soccer Videos. Master's thesis, Korea Advanced Institution of Science and Technology (KAIST), 2008.
J. Konrad, M. Wang, P. Ishwar, C. Wu, and D. Mukherjee. Learning-based, automatic 2D-to-3D image and video conversion. IEEE Transactions on Image Processing, 22(9):3485{3496, 2013.
A. Levin, D. Lischinski, and Y. Weiss. A closed-form solution to natural image matting. IEEE Transactions on Pattern Analysis and Machine intelligence, 30(2):228{242, 2008.
C.-W. Liu, T.-H. Huang, M.-H. Chang: K.-Y. Lee, C.-K. Liang, and Y.-Y. Chuang. 3D cinematography principles and their applications to stereoscopic media processing. In Proc. of ACM Multimedia Conference (MM'11), pp. 253{262, Scottsdale, AZ, Nov. 2011.
P. Ochs, J. Malik, and T. Brox. Segmentation of moving objects by long term video analysis. IEEE Transactions on Pattern Analysis and Machine Intelligence, 36(6):1187{1200, 2014.
A. Oliva and A. Torralba. Modeling the shape of the scene: a holistic representation of the spatial envelope. International Journal of Computer Vision, 42(3):145{175, 2001.
P. P_erez, M. Gangnet, and A. Blake. Poisson image editing. ACM Transactions on Graphics, 22:313{318, 2003.
R. Rzeszutek, R. Phan, and D. Androutsos. Depth estimation for semi-automatic 20 to 3D conversion. In Proc. of ACM Multimedia Conference (MM'12), pp. 817{820, Nara, Japan, Oct. 2012,
A. Saxena, S. H. Chung and A. Y. Ng. Learning depth from single monocular images. In Proc. of Advances in Neural Information Processing Systems (NIPS'05), pp. 1161-1168, Vancouver, Canada, Dec. 2005.
L. Schnyder, O. Wang, and A. Smolic. 2D to 3D conversion of sports content using panoramas. In Proc. of IEEE Conference on Image Processing (ICIP'11), pp. 1961-1964, Brussels, Belgium, Sep. 2011.
J. Shotton, A. Fitzgibbon, M. Cook, T. Sharp, M. Pinocchio, R. Moore, A. Kipman, and A. Blake. Real-time human pose recognition in parts from single depth images. In Proc. of IEEE Conference on Computer Vision and Pattern Recognition (CVPR'11), pp. 1297-1304, Providence, RI, Jun. 2011.
W. Wu, A. Are_n, G. Kurillo, P. Agarwal, K. Nahrstedt, and R. Bajosy. Color-plus-depth level-of-detail in 3D tele-immersive video, A psychophysical approach. In Proc of ACM Multimedia Conference (MM'11), pp. 13-22, Scottsdale, Arizona, Nov. 2011.
Z. Yang, W. Wu, K. Nahrstedt, G. Kurillo, and R. Bajcsy. Viewcast: View dissemination and management for multi-party 3D tele-immersive environments. In Proc. of ACM Multimedia Conference (MM'07), pp. 882-891 Augsburg, Bavaria, Germany, Sep. 2007.
L. Zhang, C. V_azquez, and S. Knorr. 3D-TV content creation: automatic 20-to-3D video conversion. IEEE Transactions on Broadcasting, 57(2):372{383, 2011.
Z. Zhang, C. Zhou, B. Xin, Y. Wang, and W. Gao. An interactive system of stereoscopic video conversion. In Proc of ACM Multimedia Conference (MM'12), pp. 149-158, Nara, Japan, Oct. 2012.
DeepView, An Accurate View Generation from a Single Image using Deep Neural Networksn Anonymous CVPR submission: CVPR 2017 Submission #922. Confidential Review Copy. Do Not Distribute.

* cited by examiner

| Layer | Dimension | Pad | Str | Input |
|---|---|---|---|---|
| $Conv_{1,1}$ | 7 x 7 x 1 | 3 | 1 | $L$ |
| $Conv_{1,2}$ | 5 x 5 x 64 | 2 | 1 | $Conv_{1,1}$ |
| $Conv_{1,3}$ | 3 x 3 x 64 | 1 | 1 | $Conv_{1,2}$ |
| $Conv_{1,4}$ | 3 x 3 x 64 | 1 | 1 | $Conv_{1,3}$ |
| $Conv_{2,1}$ | 3 x 3 x 64 | 1 | 2 | $Conv_{1,4}$ |
| $Conv_{2,2}$ | 3 x 3 x 64 | 1 | 1 | $Conv_{2,1}$ |
| $Conv_{2,3}$ | 3 x 3 x 64 | 1 | 1 | $Conv_{2,2}$ |
| $Conv_{2,4}$ | 3 x 3 x 64 | 1 | 1 | $Conv_{2,3}$ |
| $Conv_{3,1}$ | 3 x 3 x 64 | 1 | 2 | $Conv_{2,4}$ |
| $Conv_{3,2}$ | 3 x 3 x 64 | 1 | 1 | $Conv_{3,1}$ |
| $Conv_{3,3}$ | 3 x 3 x 64 | 1 | 1 | $Conv_{3,2}$ |
| $Conv_{3,4}$ | 3 x 3 x 64 | 1 | 1 | $Conv_{3,3}$ |
| $Conv_{4,1}$ | 3 x 3 x 64 | 1 | 2 | $Conv_{3,4}$ |
| $Conv_{4,2}$ | 3 x 3 x 64 | 1 | 1 | $Conv_{4,1}$ |
| $Conv_{4,3}$ | 3 x 3 x 64 | 1 | 1 | $Conv_{4,2}$ |
| $Conv_{4,4}$ | 3 x 3 x 64 | 1 | 1 | $Conv_{4,3}$ |
| $Conv_{5,1}$ | 3 x 3 x 64 | 1 | 2 | $Conv_{4,4}$ |
| $Conv_{5,2}$ | 3 x 3 x 64 | 1 | 1 | $Conv_{5,1}$ |
| $Conv_{5,3}$ | 3 x 3 x 64 | 1 | 1 | $Conv_{5,2}$ |
| $Conv_{5,4}$ | 3 x 3 x 64 | 1 | 1 | $Conv_{5,3}$ |
| $Conv_{6,1}$ | 4 x 4 x 64 | 1 | 1/2 | $Conv_{5,4}$ |
| $Conv_{6,2}$ | 3 x 3 x 64 | 1 | 1 | $Conv_{6,1}$, $Conv_{4,4}$ |
| $Conv_{6,3}$ | 3 x 3 x 64 | 1 | 1 | $Conv_{6,2}$ |
| $Conv_{6,4}$ | 3 x 3 x 64 | 1 | 1 | $Conv_{6,3}$ |
| $Conv_{7,1}$ | 4 x 4 x 64 | 1 | 1/2 | $Conv_{6,4}$ |
| $Conv_{7,2}$ | 3 x 3 x 64 | 1 | 1 | $Conv_{7,1}$, $Conv_{3,4}$ |
| $Conv_{7,3}$ | 3 x 3 x 64 | 1 | 1 | $Conv_{7,2}$ |
| $Conv_{7,4}$ | 3 x 3 x 64 | 1 | 1 | $Conv_{7,3}$ |
| $Conv_{8,1}$ | 4 x 4 x 64 | 1 | 1/2 | $Conv_{7,4}$ |
| $Conv_{8,2}$ | 3 x 3 x 64 | 1 | 1 | $Conv_{8,1}$, $Conv_{2,4}$ |
| $Conv_{8,3}$ | 3 x 3 x 64 | 1 | 1 | $Conv_{8,2}$ |
| $Conv_{8,4}$ | 3 x 3 x 64 | 1 | 1 | $Conv_{8,3}$ |
| $Conv_{9,1}$ | 4 x 4 x 64 | 1 | 1/2 | $Conv_{8,4}$ |
| $Conv_{9,2}$ | 3 x 3 x 64 | 1 | 1 | $Conv_{9,1}$, $Conv_{1,4}$ |
| $Conv_{9,3}$ | 3 x 3 x 64 | 1 | 1 | $Conv_{9,2}$ |
| $Conv_{9,4}$ | 3 x 3 x 1 | 1 | 1 | $Conv_{9,3}$ |

DESCRIPTION OF EXEMPLARY NETWORK ARCHITECTURE

FIG. 6

VIEW GENERATION FROM A SINGLE IMAGE USING FULLY CONVOLUTIONAL NEURAL NETWORKS

TECHNICAL FIELD

The present invention relates to generation of a stereoscopic 3D image from a single image.

BACKGROUND

Single-image-based view-generation (SIVG) or 2D to 3D image conversion is a technique to generate a new view image from a single image. It has typically aimed to generate the right-view image from a left-view image in a stereoscopic viewing scenario. SIVG has been actively studied over decades, as it can be widely applied to provide richer representations and important perceptual cues on image understanding as well as 3D modeling, etc. SIVG techniques are becoming more and more important, as the dominant portions of the 3D movie and virtual reality (VR) markets are coming from 3D content production and consumption. Furthermore, computationally efficient SIVG methods can bring significant benefits as many 3D contents are consumed on mobile devices. Typically SIVG consists of two main stages:
1. single-image-based depth estimation (SIDE); and
2. depth image-based-rendering (DIBR).
Mathematically, SIDE and DIBR can be formulated as:

$$D=h(L|\theta_h), \quad (1)$$

$$R=g(L,D|\theta_g) \quad (2)$$

Where L, D, R are the left-view image, estimated depth map, and estimated right-view image, respectively. h(_) in Eq. 1 and g(_) in Eq. 2 are considered SIDE and DIBR, respectively. $\theta_h$ in Eq. 1 and $\theta_g$ in Eq. 2 are model parameters.

It should be noted that disparity and depth are used herein interchangeably based on an assumption of the standard stereoscopic viewing condition where depth and disparity values are linearly proportional. Most existing approaches have focused on estimating accurate depth maps, that is, they aim to model h(_) in Eq. 1. For example as described in U.S. application Ser. No. 15/749,509 dated Feb. 1, 2018 the disclosure of which is incorporated herein by reference.

Previous depth estimation approaches have relied on utilizing one or a few depth cues in images, such as color, scattering, defocus, saliency regions and/or utilizing an image database. Recent works related to depth estimation suggested use of a convolutional neural network (CNN)-based data-driven approaches. Although these approaches showed remarkable performance improvement compared to previous hand-craft features-based approaches, DIBR in Eq. 2 (depth image rendering) should additionally be performed for SIVG, which often involves much computation and visual distortion.

Recently, Xie et al. (J. Xie, R. Girshick, and A. Farhadi. Deep3d: Fully automatic 2d-to-3d video conversion with deep convolutional neural networks. arXiv preprint arXiv: 1604.03650, 2016) proposed an end-to-end SIVG method, called Deep3D. The network architecture of Deep3D relies on a pre-trained CNN (VGG-16 Net) with a rendering network. Deep3D showed the highest prediction performance in SIVG compared with the CNN based depth-estimation methods followed by a standard DIBR. However, Deep3D requires large memory space with much computational complexity as it relies on pre-trained CNNs with fully-connected (dense) layers. Also, the dense fully connected layers in Deep3D inevitably limit the spatial resolution of its input and output (i.e., 384 by 160), thus constraining flexibility and applicability.

SUMMARY

An aspect of an embodiment of the disclosure relates to a system and method of rendering 3D images from a single image, for example to generate a right image from a given left image for 3D viewing. The method includes receiving a collection of 3D image pairs (right and left images). Training a fully convolutional neural network (FCN) that has convolutional layers without any fully connected layers so that it can handle images of varying resolutions.

After training the fully convolutional neural network, images are provided to the neural network as input and the neural network generates as output a pair 3D image for the provided images (e.g. a right image based on a given left image). The pair of images can be viewed as a 3D image.

In an exemplary embodiment of the disclosure, the images are initially in RGB form and converted to YCbCR form. The Y channel of the image represents a luminance part of the image and the CbCr channel of the image represents a chrominance part of the image. Optionally, the neural network is decoupled into two separate neural networks: a luminance network and a chrominance network. In the decoupled neural network each of the two network parts is trained separately with the matching parts of the images from the collection. Likewise after training the decoupled neural network receives converted images as input. The decoupled neural network processes the luminance channel and the chrominance channel separately to generate the pair image as output in YCbCr form. The output image may then be converted to RGB form so that it can be viewed with the input image.

There is thus provided according to an exemplary embodiment of the disclosure, a method of rendering a stereoscopic 3D image from a single image, comprising:
Receiving a collection of pairs of 3D images comprising an input image and an output image that is a 3D pair of the input image;
Training a neural network composed of convolutional layers without any fully connected layers, with pairs of 3D images from the collection, to receive an input image and generate an output image that is a 3D pair of the input image; wherein the neural network is provided as an application on a computing device;
Receiving an input image;
Generating an output image that is a 3D pair of the input image by the neural network.

In an exemplary embodiment of the disclosure, the neural network includes an encoding network, a decoding network and a rendering network. Optionally, the rendering network includes a softmax layer that normalizes the output of the decoding network. In an exemplary embodiment of the disclosure, the neural network includes a conversion block that converts the received input image from RGB to Y, Cb and Cr; wherein Y serves as a luminance channel of the input and Cb and Cr serve as a chrominance channel of the input. Optionally, the neural network includes an inversion block that inverts the generated output image from a luminance channel of the output and a chrominance channel of the output back to an RGB image. In an exemplary embodiment of the disclosure, the neural network includes a luminance network that processes a luminance channel of the received input image and a chrominance network that processes a chrominance channel of the received input image. Optionally, the luminance network and the chrominance network each comprise an encoding network and a decoding network.

In an exemplary embodiment of the disclosure, the chrominance channel of the received input image is downscaled by a factor of two before processing with the chrominance network. Optionally, the luminance network is trained with luminance channels of the images of the collection and the chrominance network is trained with chrominance channels of the images of the collection. In an exemplary embodiment of the disclosure, each convolution layer except the last layer is followed by a rectified linear unit (ReLu) layer. Optionally, some of the convolution layers downscale or upscale their input to reduce distortion in the output. In an exemplary embodiment of the disclosure, the convolution layers of the neural network are configured to accept images of varying resolutions.

There is further provided according to an exemplary embodiment of the disclosure, a system for rendering a stereoscopic 3D image from a single image, comprising:

A collection of pairs of 3D images comprising an input image and an output image that is a 3D pair of the input image;

A computing device;

A neural network application composed of convolutional layers without any fully connected layers that is configured to be executed on the computing device and programed to:

train the neural network, with pairs of 3D images from the collection, to receive an input image and generate an output image that is a 3D pair of the input image;

receive an input image;

generate an output image that is a 3D pair of the input image

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale and element or part may be relatively larger or smaller than actually shown.

DETAILED DESCRIPTION

Figure 1:
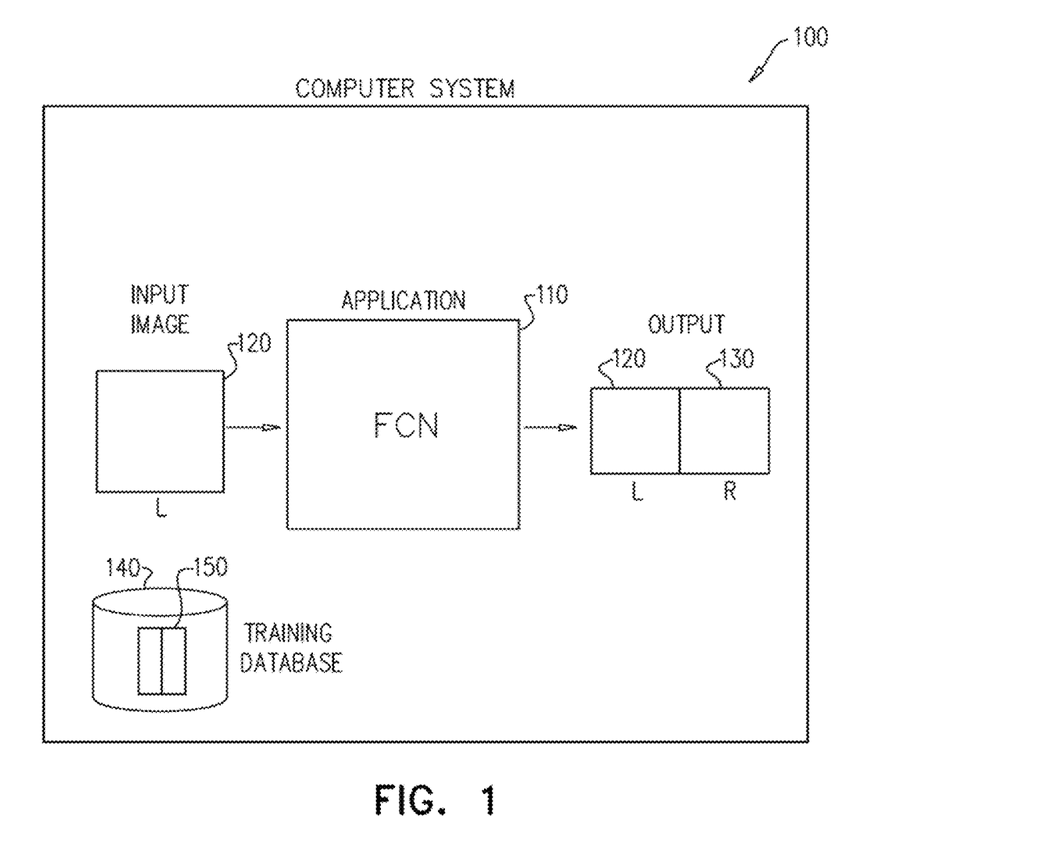
FIG. 1 is a schematic illustration of a system for rendering stereoscopic 3D images, according to an exemplary embodiment of the disclosure.

FIG. 1 is a schematic illustration of a computerized system 100 for rendering stereoscopic 3D images, according to an exemplary embodiment of the disclosure. Optionally, computerized system 100 is a general purpose computer comprising a processor and memory for executing an application 110. Alternatively computerized system 100 may be a dedicated electronic circuit (e.g. an ASIC) hardwired to perform a specific application 110.

In an exemplary embodiment of the disclosure, application 110 is a neural network that is trained to receive as input an input image 120 and generate as output a matching stereoscopic 3D image that serves as a pair for the input image 120. For example the left image is provided as input image 120 and the generated output image 130 will serve as the right image or vice versa. Optionally, system 100 may output a pair comprising the left input image 120 and the generated right output image 130.

In an exemplary embodiment of the disclosure, application 110 provides an end to end neural network that is trained with a collection of stereoscopic 3D image pairs 150 to receive input image 120 (e.g. the left image) and generate output image 130 (e.g. the right image). Optionally, a database 140 is used to store the collection of pairs 150 for training the neural network. End to end implies that the neural network of application 110 is trained based on the collection 150 to receive the input image 120 and generate the output image 130 without requiring intermediate steps to fine tune the output image 130.

In an exemplary embodiment of the disclosure, application 110 is a fully convolutional neural network composed of convolutional layers without any fully connected layers so the neural network of application 110 can process images of varying sizes. For image classification handling a specific limited sized image may suffice, however for rendering stereoscopic images it may limit the applicability for two main reasons:

a. the rendering quality is directly related to the resolution;

b. images may come in different sizes thus requiring additional resizing steps.

Optionally, the fully convolutional network is combined with a rendering neural network before the output to combine parts of the image and form the output image 130. The combined neural networks are trained together. In an exemplary embodiment of the disclosure, the rendering neural network is a softmax layer, which can handle any image dimension as long as the image was processed by the preceding convolutional layers.

In an exemplary embodiment of the disclosure, the input image 120 is converted from RGB form to YCbCr form having a luminance part (Y) and chrominance part (Cb and Cr) to enhance processing. In an exemplary embodiment of the disclosure, the neural network of application 110 is split into two channels: a luminance channel and a chrominance channel. The two channels are trained separately one to process the luminance part (Y) and one to process the chrominance part (Cb and Cr). Each channel is then used to process the respective part of the input image 120. Optionally, the separation enhances the quality of the output image 130 and/or reduces computation complexity thus increasing processing speed.

Fully convolutional networks (FCN) have been used successfully in super resolution problems. Exemplary cases have been performed using 3 layers and very deep FCN architecture (e.g. 20 layers). To boost network convergence a residual learning and gradient clipping method may be used. Likewise a symmetric skip connection between encoding and decoding networks can be used to transfer high frequency details to the output. Accordingly, FCN's can be effectively applied for per-pixel regression problems with much efficiency and accuracy.

Figure 2:
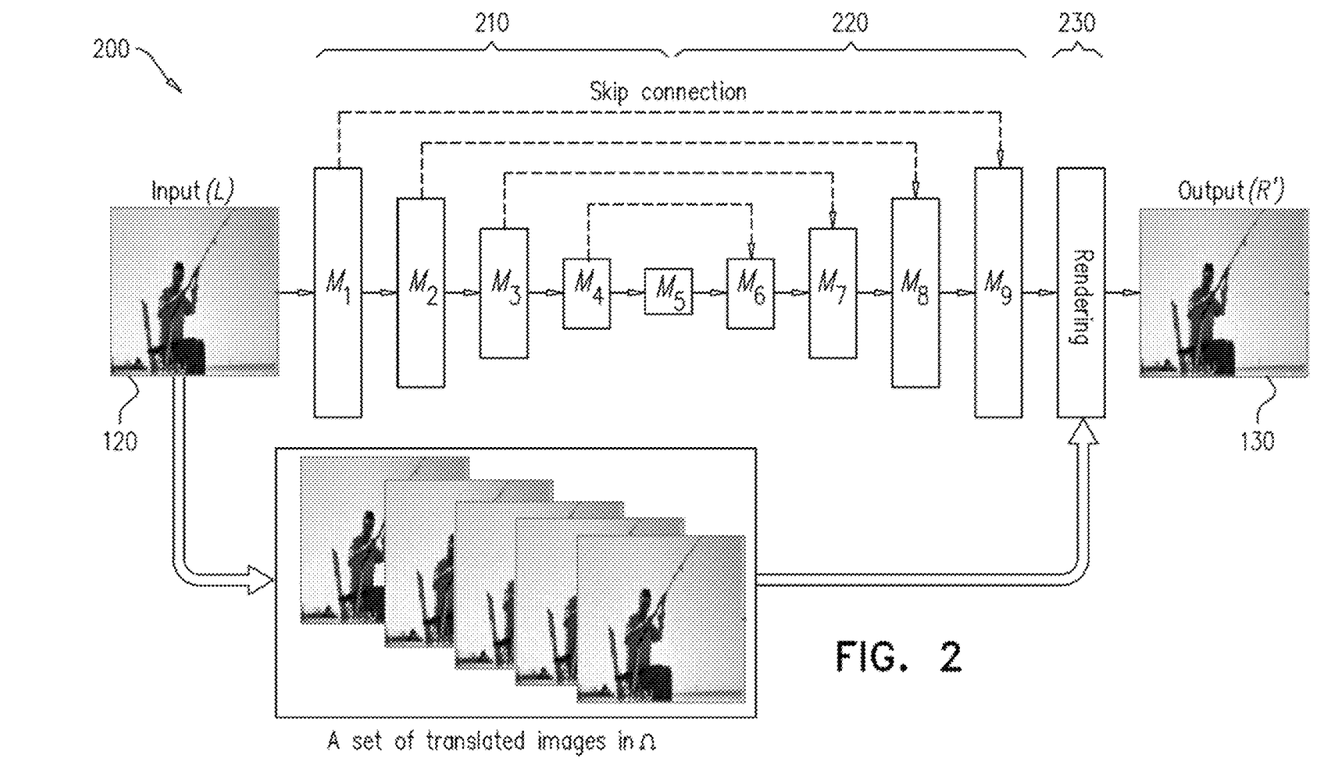
FIG. 2 is a schematic illustration of a fully convolutional neural network, according to an exemplary embodiment of the disclosure.

FIG. 2 is a schematic illustration of a fully convolutional neural network (FCN) 200, according to an exemplary embodiment of the disclosure. In an exemplary embodiment of the disclosure, the FCN 200 is divide into three stages or three sub neural networks: an encoding network 210, a decoding network 220 and a rendering network 230. The encoding network extracts low, middle and high level features from the input image 120 and transfers them to the decoding network 220. After decoding, the rendering network 230 generates probabilistic disparity maps and estimates the output image 130. The output image 130 is rendered using the set of images translated by the disparity range. In an exemplary embodiment of the disclosure, the FCN architecture is based on units of convolution modules (M) each of which consists of a set of K convolution layers followed by an activation unit. Optionally, rectification linear units (ReLU) are used for activation. For example, the encoding network 210 and decoding network 220 may comprise a total of 9 modules ($M_i$, i=1, ..., 9) having a total of 9×K convolution layers in the architecture. For simplified description, we denote the j-th convolution layer in the i-th convolution module as $Conv_{i,j}$.

Optionally, ReLU is not applied for the last convolution layer of the decoding network as the rendering network 230 contains a softmax activation unit. This normalizes the output of the decoding network 210.

Estimating depth requires wide contextual information from the entire scene. In order to secure large receptive fields for FCN 200, multiple downscaling and up-scaling convolution (deconvolution) layers with strides of 2 and 0.5 may be used, respectively. That is, the first convolution layers of $M_i$, i=1, ..., 4 convolve with a stride of 2, and the last convolution layers of $M_i$, i=6, ..., 9 convolve with a stride of 0.5. Optionally, FCN 200 uses skip connections with additions, which transfer sharp object details to the decoding network 220. Thus, the outputs of $Conv_{1,K-1}$, $Conv_{2,K-1}$, $Conv_{3,K-1}$, and $Conv_{4,K-1}$ in the encoding network 210 are connected to the inputs of $Conv_{6,2}$, $Conv_{7,2}$, $Conv_{8,2}$, and $Conv_{9,2}$ respectively in the decoding network 220.

Figure 3:
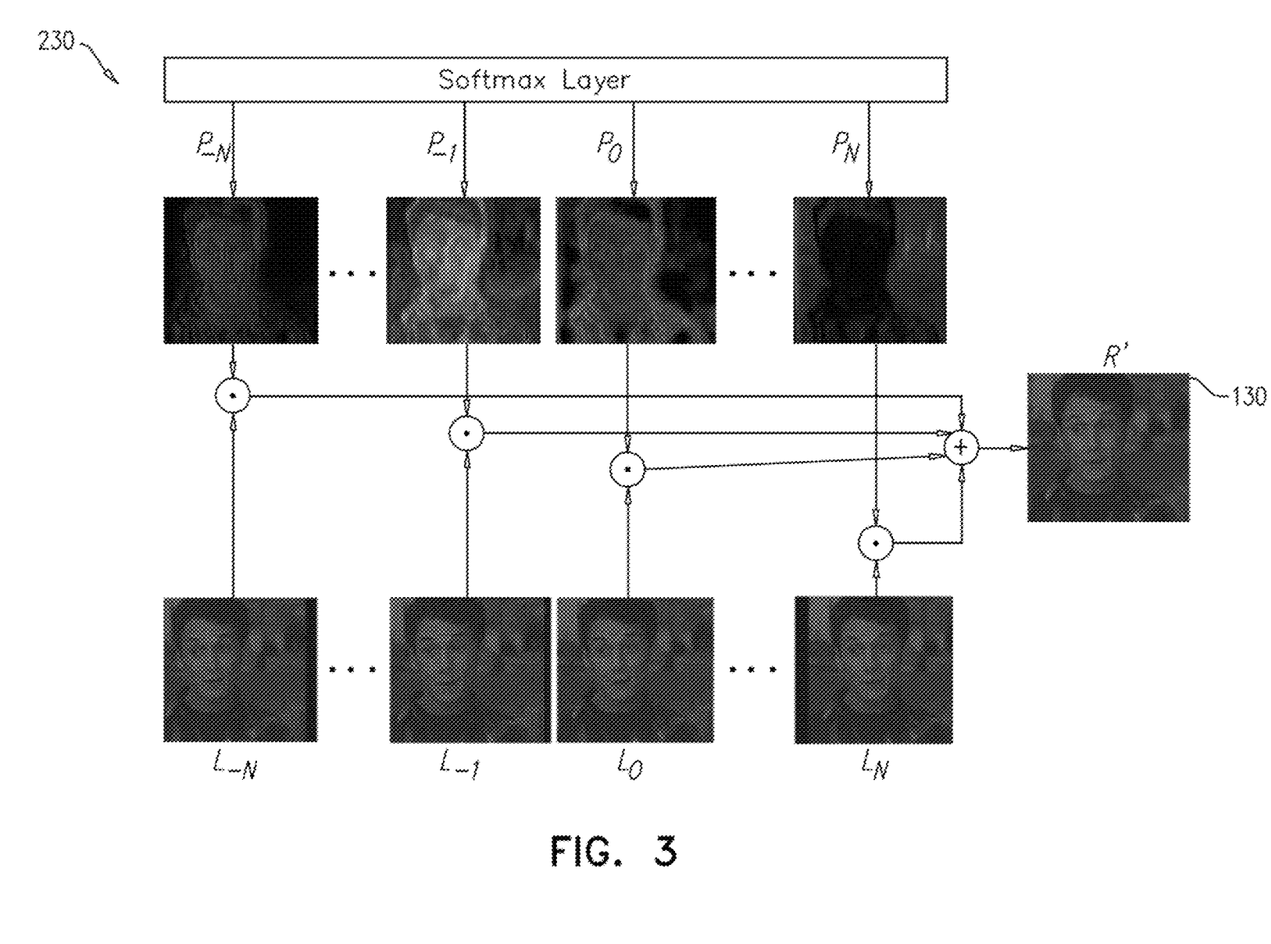
FIG. 3 is a schematic illustration of a rendering network of the fully convolutional neural network, according to an exemplary embodiment of the disclosure.

FIG. 3 is a schematic illustration of the rendering network 230 of the fully convolutional neural network 200, according to an exemplary embodiment of the disclosure. The rendering network 230. Includes a softmax layer that normalizes the output of the decoding network 220 to probabilistic values over channels ($P_i$; i∈Ω). Where, the number of channels is identical to the number of values in a disparity range Ω={-N, -N+1, ..., 0, 1, ... N}. The softmax layer approximates the max operation, it gives sparsity in selecting disparity values at each pixel location.

The final right-view image (output image 130) is synthesized by pixel-wise multiplication between P and their correspondingly-translated left-images (input image 120). This can be expressed mathematically by:

$$R'(x,y,c)=\Sigma_{(i\in\Omega)}P_i(x,y)L_i(x,y,c);$$

Where R' represents the generated output image 130, L represents the input image 120, (x, y)∈(H×W) is the pixel index in an (H×W) sized image, and c is the index for RGB color channels.

Figure 4:
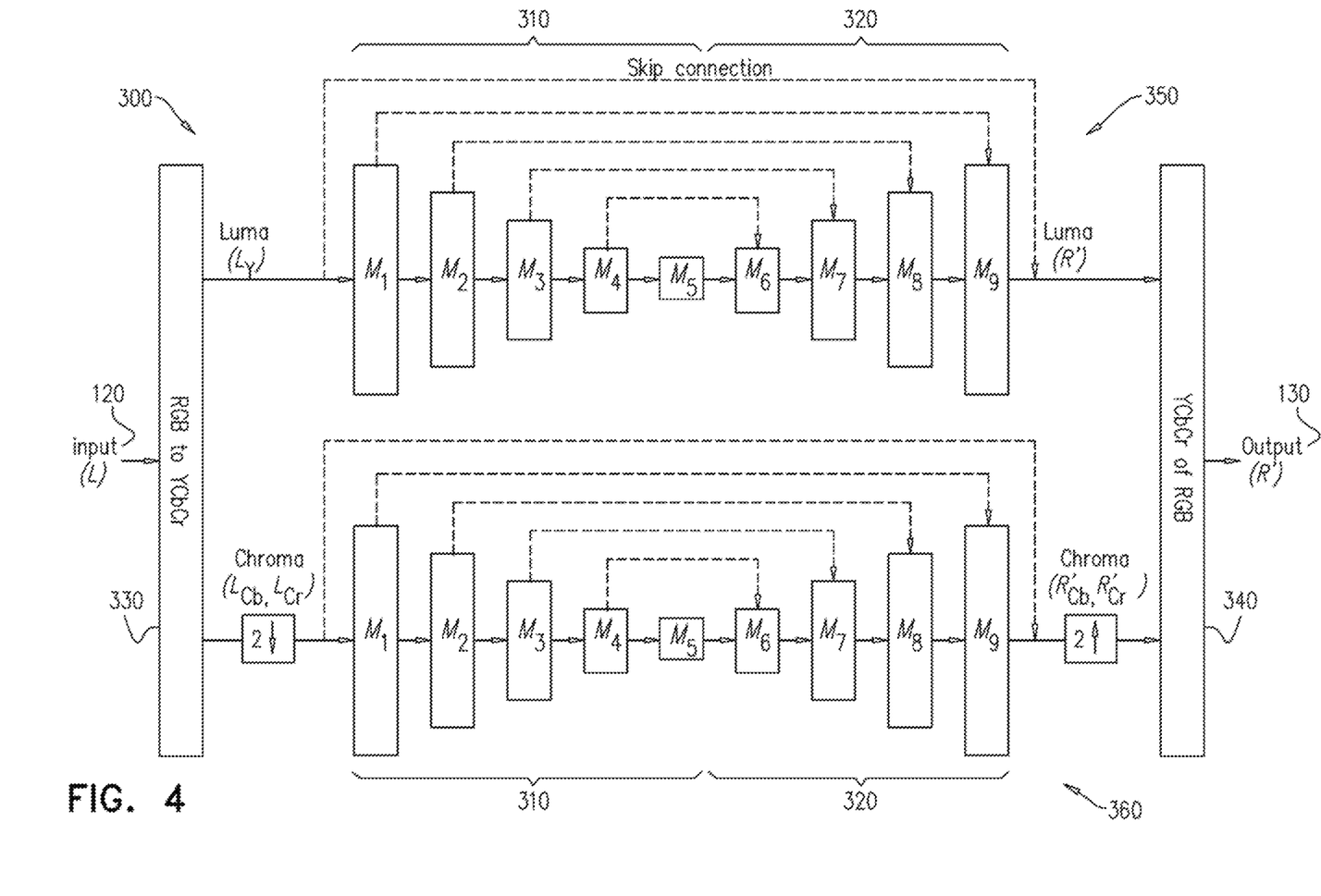
FIG. 4 is a schematic illustration of a decoupled fully convolutional neural network comprising a luminance network and a chrominance network, according to an exemplary embodiment of the disclosure.

FIG. 4 is a schematic illustration of a decoupled fully convolutional neural network 300 comprising a luminance network 350 and a chrominance network 360, according to an exemplary embodiment of the disclosure. The luminance network 350 and the chrominance network 360 have a similar structure, however they are each trained separately and used to infer a part (Y, CbCr) of output image 130 separately. In an exemplary embodiment of the disclosure, decoupled FCN 300 processes the chrominance (Cb, Cr) and luminance (Y) channels of input image 120 separately to improve accuracy of the generated output image 130. In an exemplary embodiment of the disclosure, each of the networks (350, 360) comprises two stages: an encoding network 310 stage and a decoding network 320 stage respectively. Optionally, at the input the images 120 are received as RGB images and converted by a conversion block 330 to Y, Cb, and Cr images where Cb and Cr images are further downscaled with a factor of 2, since they are based on two combined channels. Conceptually, the encoding network 310 extracts low, middle and high level features from the respective part of the input image 120 and transfers them to the decoding network 320. The inferred images by the decoding network 320 are inverted by a conversion block 340 back to an output image 130 in RGB form. Note that the luminance network 350 is trained with only Y channel images while the chrominance network 360 is trained with both Cb and Cr channel images.

Figure 5:
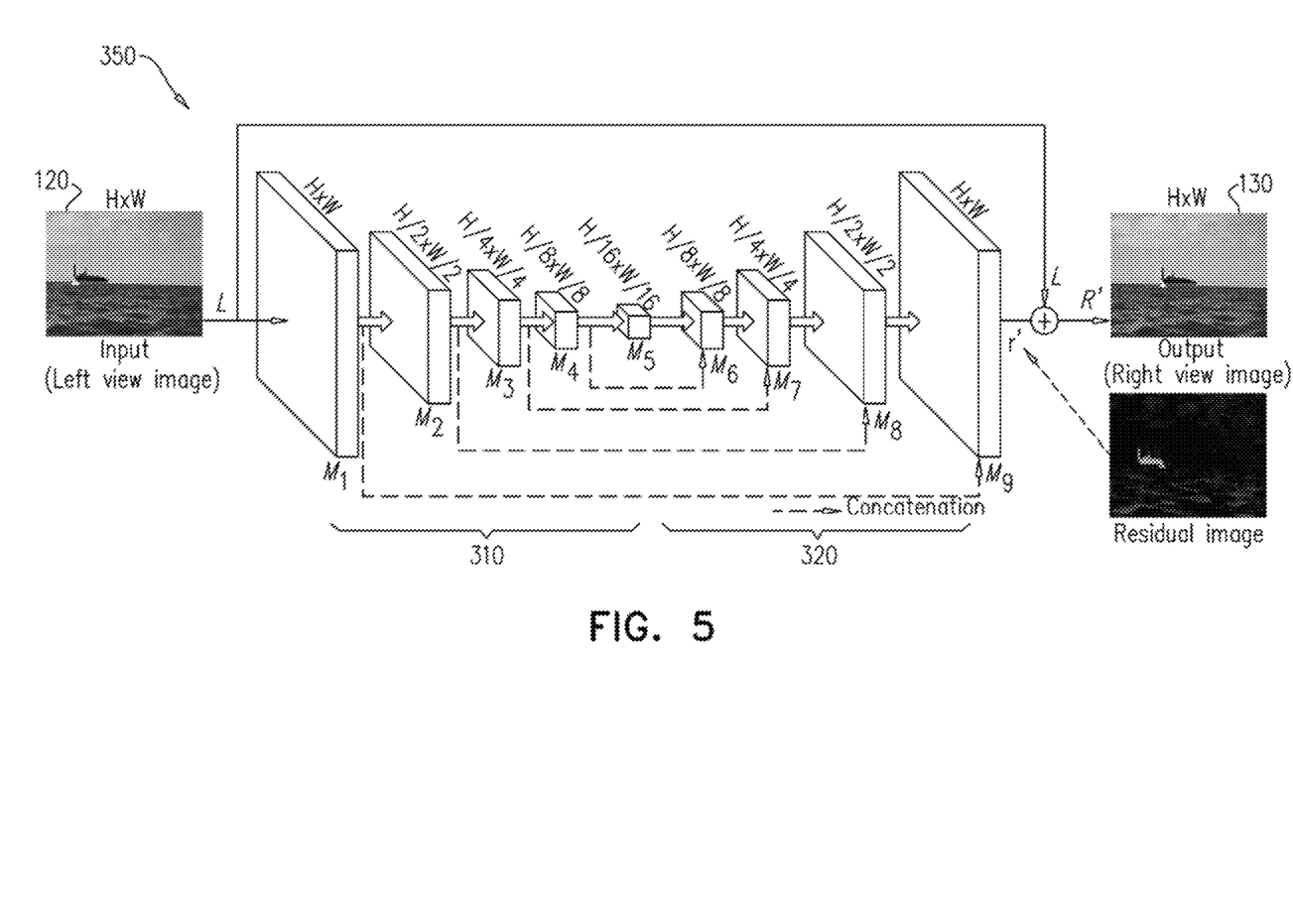
FIG. 5 is a schematic illustration of a luminance network of a decoupled fully convolutional neural network, according to an exemplary embodiment of the disclosure.

FIG. 5 is a schematic illustration of luminance network 350 of decoupled fully convolutional neural network 300, according to an exemplary embodiment of the disclosure. H and W indicate the height and width of input/output images. Decoupled fully convolutional neural network 300 consists of two decoupled networks having the same architecture: luminance network 350 and chrominance network 360. Each network (luminance network 350 and chrominance 360) trains and infers separately. FIG. 5 only shows luminance network 350 since chrominance network 360 has the same architecture.

In an exemplary embodiment of the disclosure, instead of using three decoupled networks for each RGB channel, only two decoupled networks are used for luminance and chrominance channels. Note that luminance network 350 is trained with only Y channel images while chrominance network 360 is trained with both Cb and Cr channel images. This is because luminance and chrominance signals are strongly decorrelated while Cb and Cr signals share very similar statistical characteristics. It is known that the human visual system (HVS) is more sensitive to distortions in luminance signals in contrast to chrominance signals.

In an exemplary embodiment of the disclosure, a chroma subsampling technique is implemented to preprocess chrominance network 360 to downscale the chrominance channels with a factor of 2. That is, chrominance network 360 takes input of downscaled Cb and Cr images with a factor of 2 and produces correspondingly-sized output. Optionally, the chroma subsampling technique significantly reduces computational complexity while keeping high visual quality of estimated right-view images.

In an exemplary embodiment of the disclosure, the network architecture of FCN network 300 is based on multiple units of convolution modules (M) each of which consists of a set of four convolution layers. In some embodiments more modules (M) and layers or less modules (M) and layers may be used. However any change to the number of modules and layers requires retraining the network 300. Additionally, the number of modules and layers may affect the consumption of the processor time and memory usage and may affect the quality of the results. Note also that, since the luminance network 350 and the chrominance network 360 have the same architecture, the description related to luminance network 350 is relevant also to chrominance network 360. Optionally, with 4 convolution layers luminance network 350 comprises 9 modules (Mi, i=1, . . . 9) having a total of 36 convolution layers each followed by a ReLU. For simplified description, we will denote the j-th convolution layer followed by a rectified linear unit (ReLU) layer in the i-th module as $Conv_{i,j}$. Mathematically, the operation of $Con_{i,j}$ can be written as:

$$X_{i,j}=\max(W_{i,j}*X_{i,j-1}+b_{i,j},0) \quad (3)$$

Where $X_{i,j-1}$ and $X_{i,j-1}$ are the input and output of the j-th convolution layer in the i-th module. $W_{i,j} \in f1 \times f2 \times f3 \times f4$ and $b_{i,j} \in f4$ in Eq. 3 are the weights and bias values of the convolution, respectively, where f1, f2 and f3 are the kernel height, width and depth, while f4 is the number of convolution filters which correspond to the number of channels in $X_{i,j-1}$. Since f3 in a convolution layer is determined as the number of channels of its input from preceding layers (e.g. not including input from skip connections as shown in FIGS. 2, 4, 5 and 6).

Figure 6:
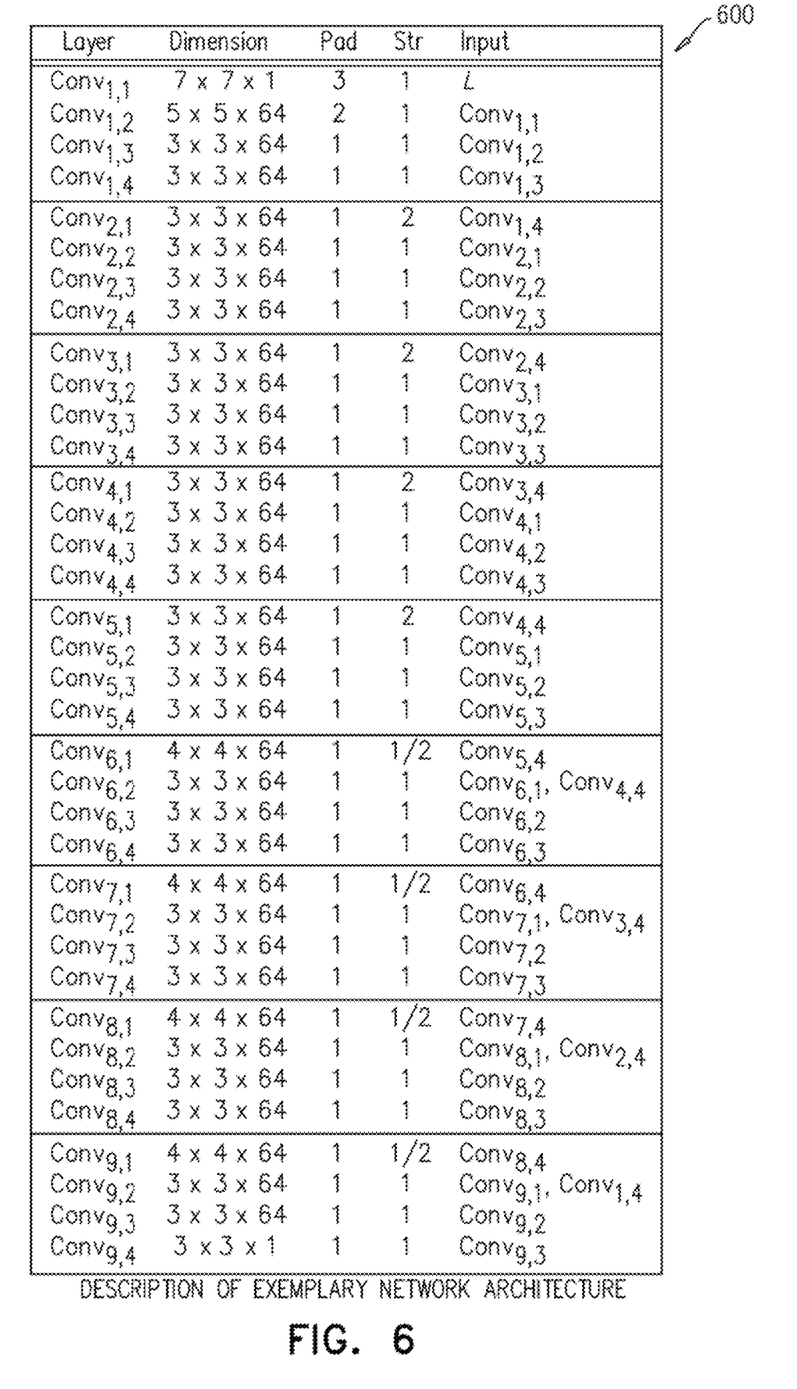
FIG. 6 is a schematic illustration of a table of an exemplary architecture for implementing a decoupled fully convolutional neural network, according to an exemplary embodiment of the disclosure.

Therefore only f1×f2×f4 are shown in representing the dimension of a convolution layer. FIG. 6 is a schematic illustration of a table 600 of an exemplary architecture for implementing a decoupled fully convolutional neural network 300, where Pad and Str indicate padding and stride values of a convolution layer. Note that ReLU is not applied for the last convolution layer ($Conv_{9,4}$) as it is not necessary in image restorations to apply ReLU to the last convolution layers.

In an exemplary embodiment of the disclosure, large contextual information is used to enhance inferring depth from an image. Accordingly, a large receptive field size (375×375) of decoupled fully convolutional neural network 300 is secured by using convolution layers with higher and lower stride values than 1. The first convolution layers in M2, M3, M4 and M5 downscale their inputs with a factor of 2 by using the stride value of 2 while the first convolution layers in M6, M7, M8 and M9 upscale their inputs with a factor of 2 by using the stride value of 0.5. The outputs of $Conv_{1,4}$, $Conv_{2,4}$, $Conv_{3,4}$ and $Conv_{4,4}$ are concatenated with the outputs of $Conv_{6,1}$, $Conv_{7,1}$, $Conv_{8,1}$ and $Conv_{9,1}$, respectively (e.g. $Conv_{6,2}$ receives input from $Conv_{6,1}$ and $Conv_{4,4}$ (skip connection)). Optionally, upscaling and downscaling enhance the transfer of high frequency image details to the output of the network 300, thus reasonably reducing blur distortions in output images 130 that can be mainly caused by the reduction of spatial resolution in the intermediate layers.

In an exemplary embodiment of the disclosure, the residual (r=R−L) between the input image 120 and the output image 130 may be examined to determine the quality of the result achieved by network 200 or network 300 and to help converge to better local minima by effectively eliminating redundancy between left- and right-view images. Note that the disclosed networks (200, 300) consists only of convolution layers each of which does not limit its input/output sizes. On the other hand, the fully-connected layers in prior art networks confine input/output sizes to their number of weights, thus constraining their spatial scalability.

In an exemplary embodiment of the disclosure, network 200 or network 300 may be used to directly map left to right view images thus providing a vast source of stereoscopic movies, which can be used to train future networks. Optionally, full high definition (FHD) images (e.g. 1920 by 1080 or higher) are used to train the networks (200, 300) to optimize the output of the networks.

In an exemplary embodiment of the disclosure, database 140 comprises a collection of left and right pairs 150 of images to train FCN networks 200 and 300. The database may be collected from non-animated stereo movies preferably having full HD (1920×1080) resolution or higher although lower resolutions may also be used. Optionally, the pairs 150 may originate from a variety of genres including action, adventure, drama, fantasy, romance, horror, etc. For generating the dataset, text-only frames at the beginning and/or end of the movies are eliminated. In an exemplary embodiment of the disclosure, the pairs 150 may be converted to YCbCr form to train FCN network 300. In some embodiments of the disclosure, some of the pairs 150 may be used to train the FCN networks (200, 300) and some of the pairs may be used to test the quality of the FCN networks (200, 300) and the training process. Thus optimally there will be no overlap between the training pairs and the testing pairs.

In some embodiments of the disclosure, to reduce computational complexity for training, the training/testing frames can be selected for example from every 2 seconds from database 140 to prevent training with similar images. Optionally, the images may be downscaled to work with a lower number of pixels if performance is preferred over accuracy.

In an exemplary embodiment of the disclosure, MatConvNet, which is a Matlab based CNN library may be used to construct the FCN networks (200, 300). Optionally, during training, the mean squared error (MSE) may be minimized over training data, i.e., $MSE=(Z^{-1})\|R'-R\|^2_F$, where Z is the number of pixels in an image, and $\| \|_F$ is the Frobenius norm.

In an exemplary embodiment of the disclosure, the number of convolution layers, K may be selected as 4 for each module (M) as a default setting by considering trade-off between accuracy and efficiency. This leads to a total of 36 convolution layers in the network architectures. Optionally the filter size of each convolutional layer is set to 3×3×64× 64 $\in \mathbb{R}^{H \times W \times D \times C}$ (for deconvolution layers, the filter sizes may be set to 4×4×64×64), where C is the number of filters in a convolution layer, and H, W and D correspond to the height, width and depth of each filter.

In an exemplary embodiment of the disclosure, the last convolution layer in the decoding network 320 of FCN network 200, may be set to have a filter size of 3×3×64×33 with a disparity range: $\Omega=\{-15, -14, \ldots, 16, 17\}$. Optionally, in FCN network 300 the number of filters in the last convolution layer is 1 as its input and output are Y or CbCr.

In an exemplary embodiment of the disclosure, to optimize the network, Adam solver can be used with $\beta1=0.9$, $\beta2=0.9999$, $\epsilon=10^{-8}$. The training-batch-size may be set to 64. Optionally, standard methods known in the art may be used to initialize the weights in the convolution layers. In an exemplary embodiment of the disclosure, the networks 200, 300 may be trained with a total of 30 epochs with a fixed learning rate of $10^{-4}$. It can take about one day for training in a single Nvidia GTX Titan X GPU with 12 GB memory.

Alternatively, other values than the aforementioned may be selected to optimize performance depending on the circumstances of a specific implementation.

In an exemplary embodiment of the disclosure, application 110 may be stored on a non-transitory computer medium (e.g. hard drive, CD, DVD, USB drive, magnetic tape, other magnetic media and/or other devices) so that the application may be transferred to other computers or processors and executed thereon.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

In case electrical or electronic equipment is disclosed it is assumed that an appropriate power supply is used for the operation thereof.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of rendering a stereoscopic 3D image from a single image, comprising:
   receiving a collection of pairs of stereoscopic 3D images comprising an input image and an output image that is a stereoscopic 3D pair of the input image;
   training a neural network composed of convolutional layers without any fully connected layers, with pairs of stereoscopic 3D images from the collection, to receive an input image and generate an output image that is a stereoscopic 3D pair of the input image; wherein the neural network is provided as an application on a computing device;
   upon receiving an input image, generating an output image that is a stereoscopic 3D pair of the input image by the neural network,
   wherein a first half of the convolution layers downscale their inputs with a preconfigured factor by using a stride value and
   wherein a second half of the convolution layers upscale their inputs with the preconfigured factor by using an inverse value of the stride value to reduce distortion in the output image.

2. The method according to claim 1, wherein the neural network includes an encoding network, a decoding network and a rendering network.

3. The method according to claim 2, wherein the rendering network includes a softmax layer that normalizes the output of the decoding network.

4. The method according to claim 1, wherein the neural network includes a conversion block that converts the received input image from RGB to Y, Cb and Cr; wherein Y serves as a luminance channel of the input and Cb and Cr serve as a chrominance channel of the input.

5. The method according to claim 4, wherein the neural network includes an inversion block that inverts the generated output image from a luminance channel of the output and a chrominance channel of the output back to an RGB image.

6. The method according to claim 4, wherein the neural network includes a luminance network that processes a luminance channel of the received input image and a chrominance network that processes a chrominance channel of the received input image.

7. The method according to claim 6, wherein the luminance network and the chrominance network each comprise an encoding network and a decoding network.

8. The method according to claim 6, wherein the chrominance channel of the received input image is downscaled by a factor of two before processing with the chrominance network.

9. The method according to claim 6, wherein the luminance network is trained with luminance channels of the images of the collection and the chrominance network is trained with chrominance channels of the images of the collection.

10. The method according to claim 1, wherein each convolution layer except the last layer is followed by a rectified linear unit (ReLu) layer.

11. The method according to claim 1, wherein the convolution layers of the neural network are configured to accept images of varying resolutions.

12. A system for rendering a stereoscopic 3D image from a single image, comprising:
   a collection of pairs of stereoscopic 3D images comprising an input image and an output image that is a stereoscopic 3D pair of the input image;
   a computing device;
   a neural network application composed of convolutional layers without any fully connected layers that is configured to be executed on the computing device and programmed to:
   train the neural network, with pairs of stereoscopic 3D images from the collection, to receive an input image and generate an output image that is a stereoscopic 3D pair of the input image;
   upon receiving an input image, generate an output image that is a stereoscopic 3D pair of the input image, wherein a first half of the convolution lavers downscale their inputs with a preconfigured factor by using a stride value and wherein a second half of the convolution lavers upscale their inputs with the preconfigured factor by using an inverse value of the stride value, to reduce distortion in the output image.

13. The system according to claim 12, wherein the neural network includes an encoding network, a decoding network and a rendering network.

14. The system according to claim 13, wherein the rendering network includes a softmax layer that normalizes the output of the decoding network.

15. The system according to claim 12, wherein the neural network includes a conversion block that converts the received input image from RGB to Y, Cb and Cr; wherein Y serves as a luminance channel of the input and Cb and Cr serve as a chrominance channel of the input.

16. The system according to claim 15, wherein the neural network includes an inversion block that inverts the generated output image from a luminance channel of the output and a chrominance channel of the output back to an RGB image.

17. The system according to claim 15, wherein the neural network includes a luminance network that processes a luminance channel of the received input image and a chrominance network that processes a chrominance channel of the received input image.

18. The system according to claim 17, wherein the luminance network and the chrominance network each comprise an encoding network and a decoding network.

19. The system according to claim 17, wherein the chrominance channel of the received input image is downscaled by a factor of two before processing with the chrominance network.

* * * * *